United States Patent [19]
Michaud

[11] 3,812,591
[45] May 28, 1974

[54] MULTIFUNCTION THREAD GAGE

[75] Inventor: Orean E. Michaud, Bristol, Conn.

[73] Assignee: Colt Industries Operating Corp., West Hartford, Conn.

[22] Filed: May 8, 1972

[21] Appl. No.: 251,140

[52] U.S. Cl. ............................ 33/199, 33/147 D
[51] Int. Cl. ...................... G01b 5/16, G01b 3/36
[58] Field of Search.......... 33/199 R, 199 B, 147 M, 33/169 R, 169 B, 172 B, 147 D, 148 H, 147 L

[56] References Cited
UNITED STATES PATENTS

| | | | |
|---|---|---|---|
| 2,189,775 | 2/1940 | Bleakney | 33/147 D |
| 2,543,012 | 2/1951 | Glanzer | 33/199 R |
| 2,554,024 | 5/1951 | Govoni | 33/199 R |
| 2,663,948 | 12/1953 | Sculley | 33/199 R |
| 2,749,624 | 6/1956 | McClure | 33/199 R |
| 2,789,361 | 4/1957 | Schmittke | 33/199 B |
| 2,797,496 | 7/1957 | Taft | 33/199 R |
| 2,829,442 | 4/1958 | Peickii | 33/199 B |
| 3,277,578 | 10/1966 | Johnson et al. | 33/199 R |
| 3,504,441 | 4/1970 | Linley et al. | 33/199 B |

Primary Examiner—John W. Huckert
Assistant Examiner—Milton S. Gerstein
Attorney, Agent, or Firm—Radford W. Luther; Richard A. Dornon

[57] ABSTRACT

A thread gage for measuring the pitch diameter, ovality and drunkenness of a threaded part includes two reed mechanisms which are interconnected to a gage tip in engagement with the threaded part. The reed mechanisms operate simultaneously, but in an independent manner, to respectively sense horizontal and vertical displacements of the gage tip.

20 Claims, 12 Drawing Figures

MULTIFUNCTION THREAD GAGE

BACKGROUND OF THE INVENTION

This invention relates to the measurement of characteristics of threaded parts, such as pitch diameter, drunkenness and ovality.

In recent years, technological advances have mandated fine tolerancing of threaded parts, that is, thread characteristics such as drunkenness, pitch diameter and ovality, have been required to conform to exacting specifications. To this end, measuring devices have been developed to measure the aforementioned characteristics with varying degrees of accuracy. Prior art devices for measuring drunkenness, pitch diameter and ovality, which are not of a sophisticated design, suffer from various disabilities. For example, in measuring drunkenness, one such prior art device exhibits excessive friction which can seriously affect the accuracy of the reading. Moreover, to measure pitch diameter and ovality, a typical prior art device employs a pivoting movement which limits the accuracy of a measurement, and requires changes of components to accommodate various diameters in the threaded part.

SUMMARY OF THE INVENTION

In accordance with the invention, there is provided a simple and economical measuring gage incorporating a floating structure which is adapted to be displaced, vertically or horizontally, according to the movements imparted to a gage tip which is fixedly secured thereto and in contact with the groove on the threaded part to be measured. Movements of the floating structure, either vertically or horizontally, encounter only a minimal frictional resistance to thereby not detract from the accuracy of the measurement. In addition, since vertical displacements of the gage tip engender axial motion of the floating structure, the accuracy of the measurement is greater than that of devices which employ a pivoting movement.

Another feature of the invention is the relationship between the gage tip and the support components for the threaded part which does not dictate changes in the components of the gage when a threaded part is measured which has a diameter different from that previously measured. With the present invention, the same gage tip and support components may be utilized, irrespective of the diameters of the threaded parts insofar as there is no pitch variation between the parts.

Accordingly, it is the primary object of the invention to provide a simple and economical measuring gage to ascertain the drunkenness, pitch diameter and ovality of a threaded part.

It is another object of the invention to provide a measuring gage which employs axial motion to measure drunkenness, pitch diameter and ovality of a threaded part.

It is a further object of the invention to provide a measuring gage which is adapted to measure drunkenness of threaded parts, and which does not necessitate changes in the components thereof for measuring threaded parts of varying diameters with the same pitch.

A still further object of the invention is to provide a measuring gage for a threaded member wherein the effects of friction are minimized.

These and other objects and advantages of the invention will become more readily apparent from the following detailed description taken in conjunction with the accompanying drawings.

DETAILED DESCRIPTION OF PREFERRED EMBODIMENT

Figures 1, 3:
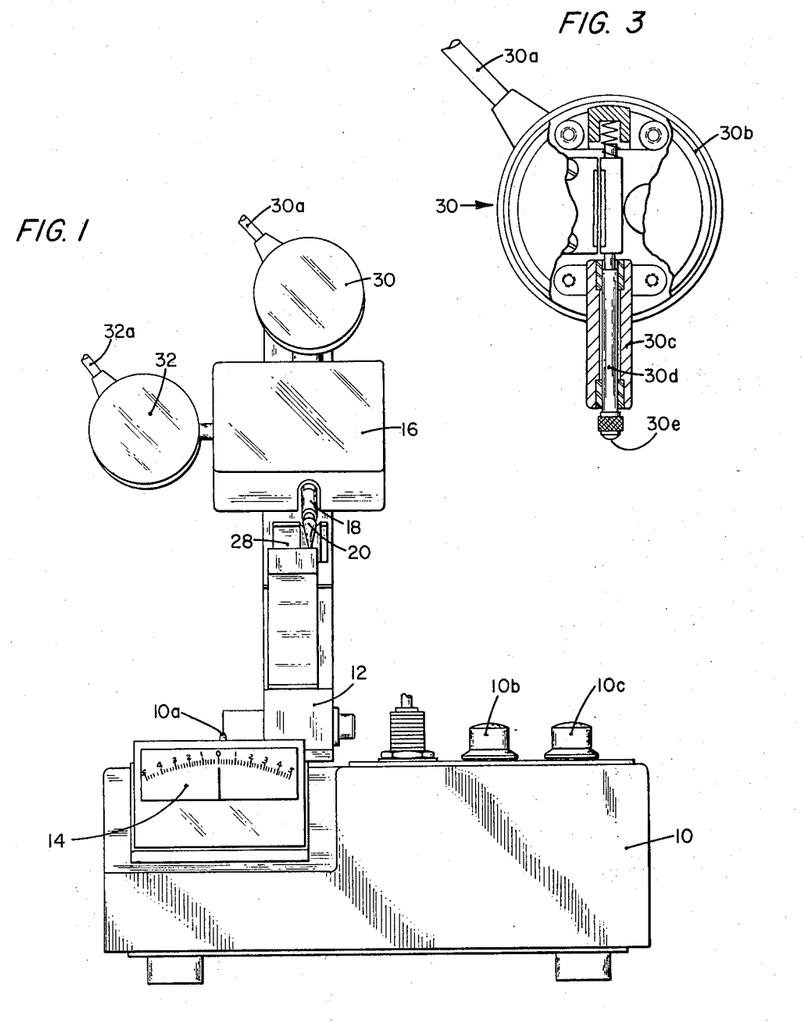
FIG. 1 is a front elevational view of a measuring gage according to the invention.
FIG. 3 is a view, partly in section, of one of the gage heads.
Figure 2:
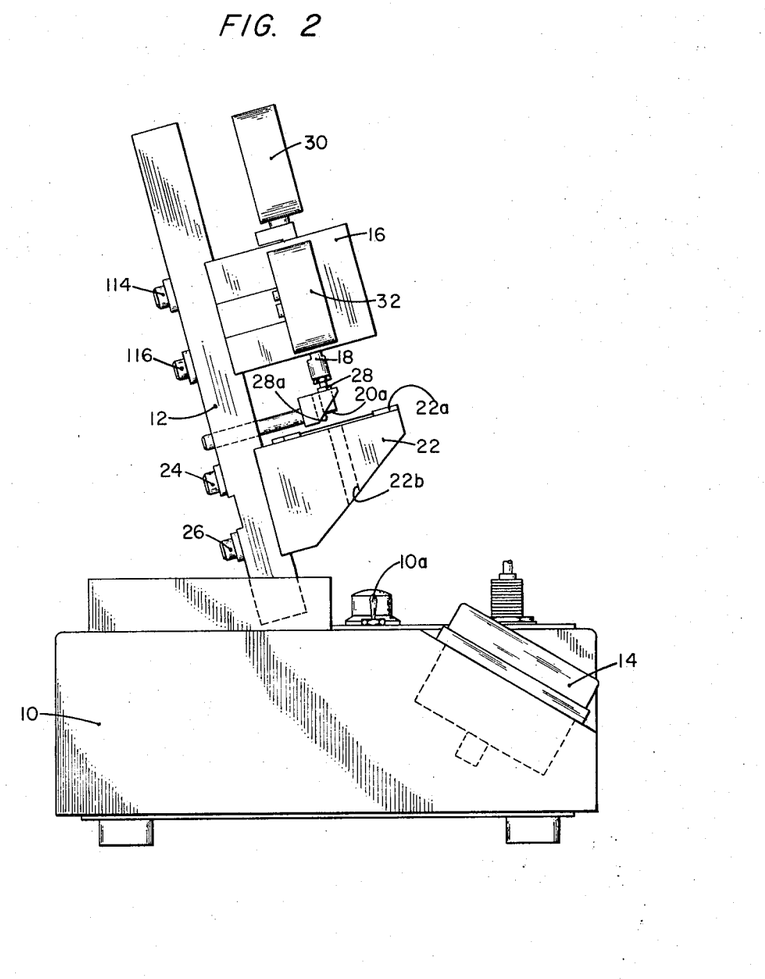
FIG. 2 is a side elevational view of the measuring gage of FIG. 1.

Referring to FIGS. 1 and 2, there is shown a measuring gage, according to the invention, adapted to measure drunkenness, ovality and pitch diameter of a threaded member. The measuring gage of FIG. 1 comprises a frame partially constituted by a base member 10 and a post member 12. Mounted upon the base member 10 is an electric meter 14 which yields readings indicative of the drunkenness, pitch diameter and ovality of a threaded part. A toggle switch 10a, located on the base member 10, is positionable in either of two positions to enable the meter 14 to furnish readings of either drunkenness or ovality and pitch diameter. Also, for initial adjustment, zero knobs 10b and 10c are mounted upon the base member for placing the pointer of meter 14 in the zero position when the toggle switch 10a occupies its respective pitch diameter and drunkenness positions, as is discussed hereinafter. A floating reed assembly, secured to the post 12 by means discussed hereinafter and surrounded by a cover 16, has depending therefrom a spindle 18 having a replaceable gage tip 20 threadably secured thereto in axial alignment therewith. The end or ridge 20a of the gage tip 20 is adapted to be received in the grooves between the threads of a threaded member (not shown).

As best shown in FIG. 2, an anvil 22 and a backstop 28 constitute a support for the threaded member. An anvil 22 is secured to the post 12 immediately below the gage tip 20 by means of bolts 24 and 26 in such a manner as to allow horizontal, i.e., lateral, adjustment of the anvil 22 for reasons hereinafter set forth. Secured to the upper surface 22a of the anvil 22 are means, hereinafter described, which guide the axial movement of a threaded part as it is rotated above the anvil 22. The backstop 28, having a front surface 28a inclined at a 45 degree angle to the upper surface of the anvil 22 and a recess 28b to provide clearance (to accommodate small diameter threaded members) for the gage tip 20, is adjustably carried by the post 12. The front slanting surface 28a of the backstop 28 functions to position a threaded member directly under the gage tip 20. Movements of the gage tip 20, as would be engendered by rotating a threaded part on the upper surface 22a of the anvil 22, are transmitted to the floating reed assembly by the spindle 18.

Gage heads 30 and 32 are operatively associated with the floating reed assembly, as will be described hereinafter, and respectively sense displacements of the gage tip 20 in the direction of the threaded member's axis (the lateral or horizontal direction) and in the direction transverse thereto (the vertical direction). The gage head 30 senses movements of the gage tip 20 in the vertical direction, and thus furnishes a signal, via a cable 30a, which is indicative of either pitch diameter and ovality. The gage head 32 senses displacements of the gage tip 20 in the direction of the threaded member's axis, and hence generates a signal, via a cable 32a, which is indicative of drunkenness. The cables 30a and 32a are suitably connected to an electrical circuit in the base member 10, which, in turn, is connected to the meter 14. It should be noted that the gage heads 30 and 32 form no part of this invention, inasmuch as any gage head capable of measuring displacements would be adequate to carry out the objects of the invention. Hence, for example, the gage heads 30 and 32 could be replaced by well-known spring loaded dial indicators which yield direct readings and operate in a purely mechanical fashion.

However, in the illustrated embodiment, the gage heads 30 and 32 are photosensitive measuring devices which convert a physical displacement into an electrical signal. This type of device is illustrated in detail in U.S. Pat. No. 3,253,153. For the purposes of describing the instant invention, the gage 30, per se, is shown in FIG. 3, the gage head 30 being identical to the gage head 32. As FIG. 3 shows, the gage head 30 is constituted by a frame 30b having a depending cylindrical portion 30c through which a spring biased probe 30d is slideably received for axial movement therein. The relationship between the tip 30e of the probe 30d to the floating reed assembly can be more readily understood from the description which follows.

Figure 4:
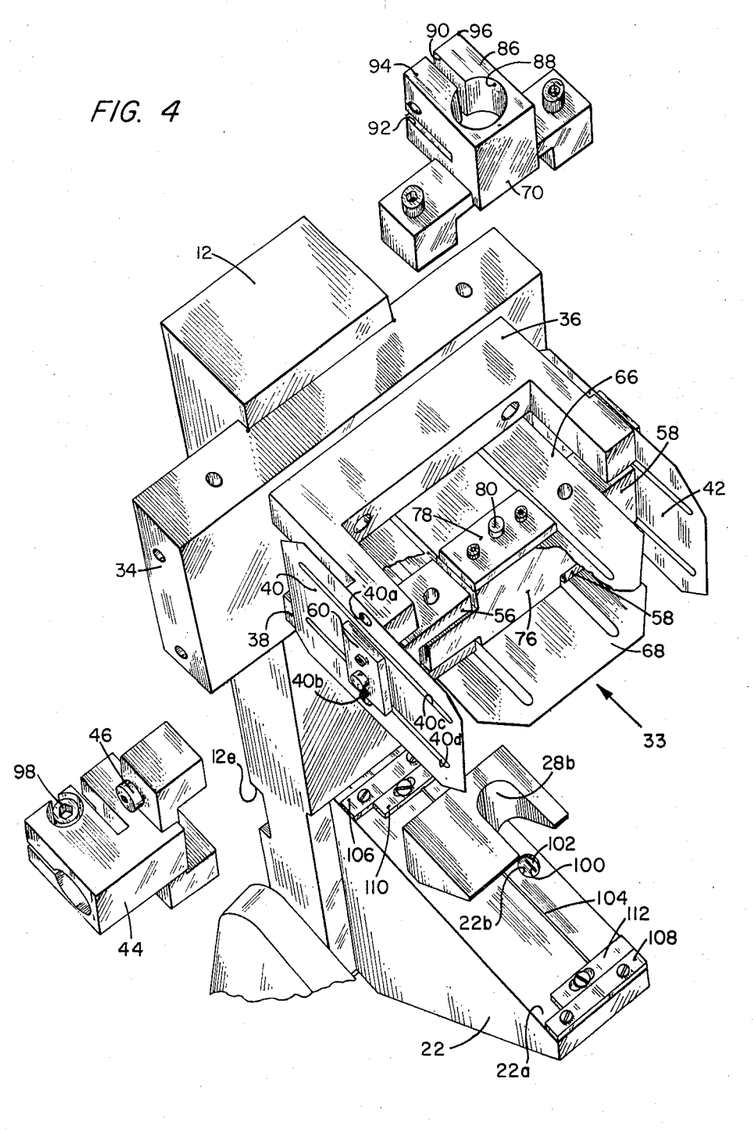
FIG. 4 is an exploded, perspective view, partially broken away, of the floating reed assembly of the gage of FIG. 1.

Turning now to FIG. 4, a preferred floating reed assembly 33 is depicted with the cover 16 removed therefrom. The floating reed assembly 33 is connected to the post 12 by means of a mounting plate 34 which is bolted onto the post 12 so as to be vertically adjustable. To the plate 34 are secured a pair of U-shaped vertically spaced mounting brackets 36 and 38 of identical construction. The mounting plate 34 and the brackets define a vertically adjustable portion of the frame. The sides of these mounting brackets 36 and 38 are attached to vertical reeds 40 and 42.

Figure 5:
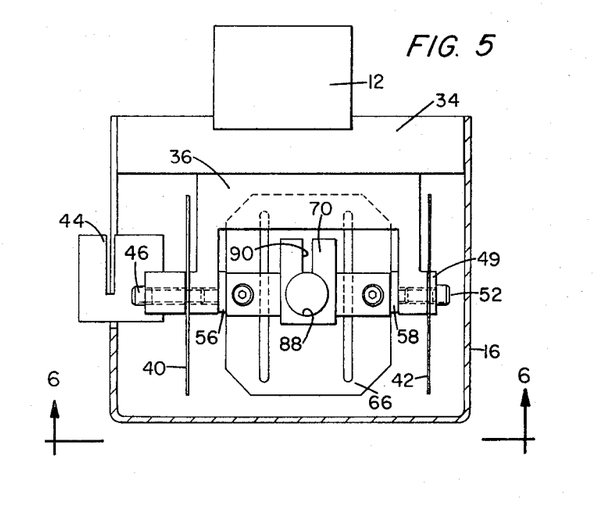
FIG. 5 is a top plan view of the floating reed assembly of FIG. 4.
Figure 6:
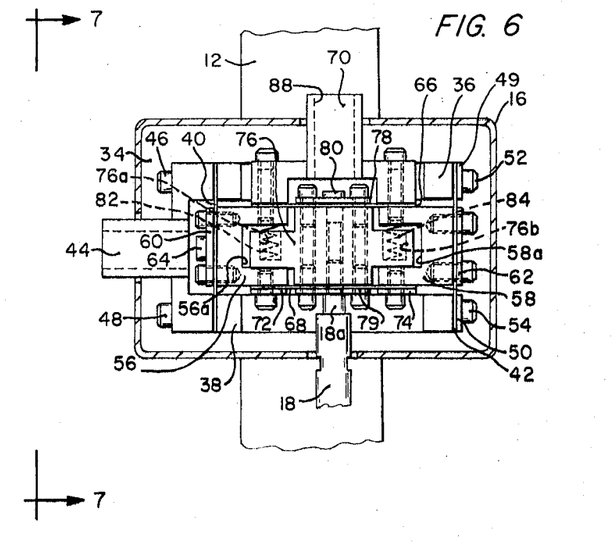
FIG. 6 is a front elevational view of the floating reed assembly of FIGS. 4 and 5, taken substantially along the line 6—6 of FIG. 5.
Figure 7:
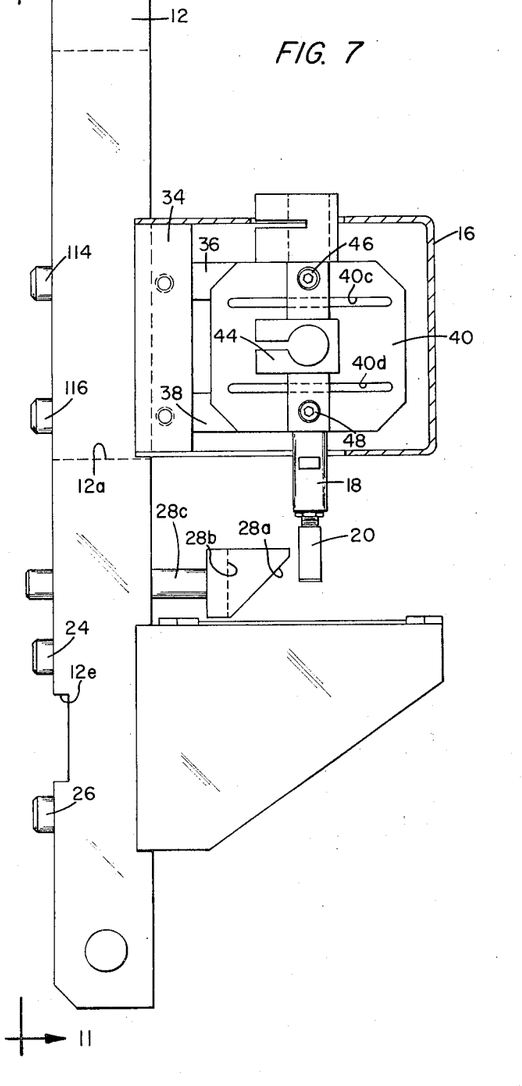
FIG. 7 is a side elevational view of the post and the floating reed assembly of FIGS. 4 through 6, taken substantially along the line 7—7 of FIG. 6.

With reference to FIG. 4, in conjunction with FIGS. 4 through 7, an indicator bracket 44 embodies screws 46 and 48 which are received within apertures 40a and 40b of reed 40 (which, in turn, are aligned with threaded cavities in the respective brackets 36 and 38) to securely fasten the vertical reed 40 to the mounting brackets 36 and 38. The reed 40, which is a flat piece of metal, such as spring steel, approximately five thousandths of an inch thick, embodies two elongated slots 40c and 40d, these slots permitting the central portion of the reed 40 to flex in a lateral manner which is perpendicular to the plane of the reed. As shown in FIGS. 5 and 6, the vertical reed 42, which is identical to the vertical reed 40, is secured to the other ends of the respective brackets 36 and 38 by means of upper and lower clamps 49 and 50, having screws 52 and 54 inserted through upper and lower apertures in the vertical reed 42, which, in turn, register with threaded bores in the ends of the respective brackets 36 and 38. Hence, before going further with the description, it will be noted that the vertical reeds 40 and 42 are secured against vertical movement by means of the indicator bracket 44 and the clamps 49 and 50, but are permitted to flex in a lateral direction (in the direction of the axis of a threaded member).

To the inboard sides of the central portions of the vertical reeds 40 and 42 are secured horizontal reed mounting structures 56 and 58 by means of respective reed clamps 60 and 62. The horizontal reed mounts 56 and 58 are generally U-shaped structures of identical construction and define rectangular cavities 56a and 58a. It should be apparent from a study of FIGS. 4 and 6 that the horizontal reed mounts 56 and 58 are wholly restrained against any vertical movement by the reeds 40 and 42, but are capable of lateral movement which causes a corresponding flexure of the central portions of the vertical reeds 40 and 42. Lateral motions of the horizontal reed mount 56 are transmitted to the tip of the probe (not shown) of gage head 32 by means of a contact abutment 64.

Directing attention to FIGS. 4 through 6, with particular reference to FIGS. 4 and 6, two horizontal reeds 66 and 68, which are identical to the previously described reeds, are secured to the respective upper and lower surfaces of reed mounts 56 and 58 by a second indicator bracket 70 and a pair of reed clamps 72 and 74. The indicator bracket 70 secures the horizontal reed 66 to the upper surfaces of the horizontal reed mounts 56 and 58 in a manner similar to that described with reference to indicator bracket 44 and vertical reed 40. Similarly, the reed clamps 72 and 74 fasten the reed 68 to the respective lower surfaces of the reed mounts 56 and 58 in a manner similar to that described with reference to reed clamps 49 and 50. Horizontal reed 66 and horizontal reed 68 are identical to vertical reeds 40 and 42 in construction, and it will be noted that each of the reeds embodies a pair of elongated slots, as described with reference to vertical reed 40.

A cross-shaped floating reed mount structure 76 is disposed between the horizontal reeds 66 and 68 with its upper and lower surfaces secured to the respective inboard surfaces of the central portions of the reeds 66 and 68 by reed clamps 78 and 79. The reed clamp 78 includes a centrally disposed contact abutment 80 thereupon which contacts the tip 30e of the probe 30d for imparting displacements thereto representative of ovality and pitch diameter. The reed clamp 79 has a centrally disposed aperture (not shown) which registers with an aperture (not shown) in the reed 68 and an aligned threaded bore in the lower portion of the floating reed mount 76. A threaded upper portion 18b (FIG. 10) of the spindle 18 is received through the registering apertures in the reed clamp 79 and the horizontal reed 68 to be threadably engaged in the threaded bore in the lower portion of the floating reed mount 76.

The outboard segments of the floating reed mount 76 are provided with vertically extending cavities 76a and 76b which respectively contain compression springs 82 and 84 which bear against the upper surfaces of the respective cavities 56a and 58b to urge the floating reed mount 76 downwardly such that the gage tip 20 firmly engages the groove of the thread on a threaded part, thereby to insure an accurate reading. In the absence of an upward urging of the spindle 18 by the gage tip 20, the springs 82 and 84 function to urge the lower surfaces of the outboard portions of the floating reed mount 76 into engagement with the lower surfaces of the respective cavities 56a and 58a.

Before proceeding further with the description, it would be profitable to briefly analyze the movement of the floating reed mount 76 when the spindle 18 is displaced vertically and horizontally, that is, in a direction transverse to the axis of the threaded member and in a direction therealong. Assuming a vertical displacement of the spindle 18 from the position shown in FIG. 6, the central portions of the reeds 66 and 68 undergo an upward flexing, while the springs 82 and 84 are compressed. By virtue of the fact that the reeds 66 and 68 are fixedly secured to the reed mounts 56 and 58 (which cannot move vertically as they are attached to the vertical reeds), the reeds 66 and 68 can only flex upwardly when the spindle 18 is moved upwardly. The only resistance to this upward displacement is offered by the springs 82 and 84, the resiliency of the central portions of the reeds 66 and 68, and the bias imposed upon the contact 80 by the spring loaded probe 30d. Thus, this upward movement of the spindle 18 encounters only negligible frictional resistance, thereby to enhance the accuracy of ovality and pitch diameter readings obtained from meter 14 via gage head 30. Lateral movements of the spindle 18 accordingly displaces not only the floating reed mount 76 in a lateral or horizontal direction, but also the indicator bracket 70, reed clamps 72, 74, 78 and 79, and reed mounts 56 and 58, together with their associated clamps 60 and 62. It will be noted from FIG. 6 that the mounting bracket 36 is sufficiently laterally spaced from the indicator bracket 70 so as not to impede such lateral displacement, and that in a like manner, reed clamps 72 and 74 are spaced from mounting bracket 38. Lateral displacement of spindle 18 then causes a flexing of the central portions of reeds 40 and 42, which, in turn, displaces the contact 64. Here again, there is a minimal friction resistance to this displacement. Resistance to a leftward lateral displacement of spindle 18 is, of course, offered by the resiliency of the central portions of the vertical reeds 40 and 42, and by the spring bias imparted to the probe of the measuring head 32, which has its tip in contact with contact abutment 64 of reed clamp 60.

To summarize succinctly, vertical displacement of the spindle 18 causes a vertical displacement of the floating reed mount 76 while the reed mounts 56 and 58 remain fixedly positioned, and a horizontal or lateral displacement of the spindle 18 produces not only a lateral displacement of floating reed mount 76, but also a lateral displacement of reed mounts 56 and 58 and indicator bracket 70. Vertical and lateral displacements of the spindle 18 may occur simultaneously, thereby producing simultaneous vertical and lateral displacements of the floating reed mount 76. Axial alignment is, of course, always maintained between the contact abutment 80 and the tip 30e of probe 30d by virtue of the fact that the indicator bracket 70 follows the lateral displacements of the floating reed mount 76.

In contradistinction to the lateral movement of indicator bracket 70, the indicator bracket 44 always remains fixedly positioned.

The identical indicator brackets 44 and 70 are configured to grasp the depending cylindrical portions of the gage heads 30 and 32 so that the respective probes thereof move axially with respect to these brackets. With reference to indicator bracket 70, and with particular reference to FIG. 4, bracket 70 includes a block segment 86 integral with the remainder of the bracket. The block segment 86 comprises a cylindrical cavity 88 and orthoginal cuts 90 and 92 which permit the upper segments 94 and 96 of block 86 to be urged together by means of an interconnecting screw, such as that shown at 98 in block 44, to constrict the diameter of the cavity 88 so that the cylindrical portion 30c of the gage head 30 is firmly received therein. It will be appreciated that such a construction facilitates rapid replacement of gage heads should the necessity for a replacement arise.

With continued reference to FIG. 4, the anvil 22 has provided on its upper surface a fixed gage roll 100, with a holder 102, and a floating roll 104, the rolls being constituted by measuring wires. The rolls 100 and 104 are adapted to be inserted in the voids between the threads to guide the axial motion of the threaded part as it is turned beneath the backstop 28. Clamps 106 and 108 prevent longitudinal movement of the floating roll which is maintained in position on the upper surface of the anvil in such a manner that it may be quickly replaced with a different roll should the pitch of the threaded part to be measured change from that previously measured. The fixed roll 100 may also be quickly replaced with another fixed roll. The fixed gage roll and the floating roll duplicate the measuring wires which are currently used in the well-known three-wire system for measuring pitch diameter. If necessary, the anvil 22 can be adjusted horizontally to position the fixed gage roll 100 one-half pitch from the gage tip, and the fixed gage roll can be set to assume the helix angle of the threaded member or to be perpendicular to the axis of the threaded member.

Figure 8:
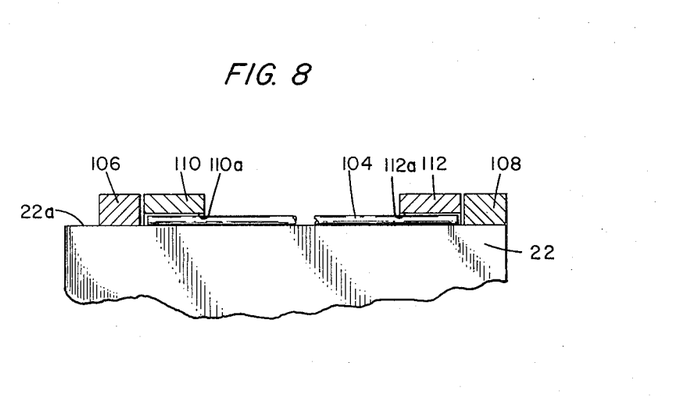
FIG. 8 is a fragmentary, side elevational view of the anvil, showing the mounting of the floating roll.
Figure 9:
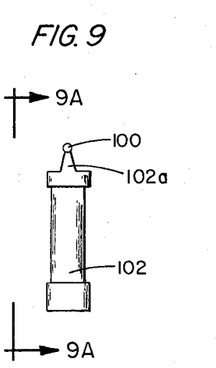
FIG. 9 is a front elevational view of the fixed roll, per se.

Reference to FIGS. 8 and 9 reveals that the floating roll 104 is merely a strand of wire which is partially restrained against lateral movement at its ends by retainers 110 and 112, which comprise respective slots 110a and 112a in which the ends of the wire are loosely contained, and which is prevented from such axial displacement as would cause the ends thereof to slide out of either of the slots 110a and 112a by the inboard faces of the clamps 106 and 108. The function of the floating roll is to stabilize the threaded member against the backstop, maintain the axes of the threaded member parallel to the surface 22a of the anvil 22, and prevent lead error from affecting the readings of pitch diameter, ovality and drunkenness. The floating roll 104 may be replaced by removal and subsequent reattachment of retainers 110 and 112.

Figure 9A:
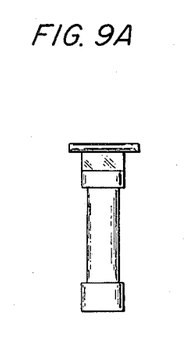
FIG. 9a is a side elevational view of the fixed roll, taken substantially along the line 9a—9a of FIG. 9.

As shown in FIGS. 9 and 9A, the fixed roll 100 is constituted by a measuring wire brazed to the top of a wedge-shaped tip 102a of the holder 102. As best shown in FIGS. 2 and 4, the holder 102 is mounted within a smooth bore 22b in anvil 22 such that it may be readily replaced, as pitch changes dictate, by means of a two set screws (not shown) in the anvil 22.

Figure 10:
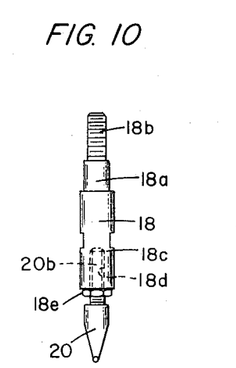
FIG. 10 is a front elevational view of the spindle and gage tip.

The detailed construction of the spindle and the gage tip may best be appreciated by reference to FIG. 10. The spindle 18 is formed by a reduced diameter, intermediate portion 18a, and the further reduced diameter, threaded end portion 18b. The lower main body portion 18c of the spindle 18 comprises a threaded bore 18d to threadably receive the threaded upper portion 20b of the gage tip 20, which also is wedge-shaped with a measuring wire brazed to its apex, this wire defining the ridge of the gage tip 20. As shown in FIG. 6, the threaded end portion 18b of the spindle is inserted in a centrally disposed threaded bore in the lower portion of the floating reed mount 76. It should be noted that the gage tip 20 is locked to the spindle 18 by means of a lock nut 18e.

Figure 11:
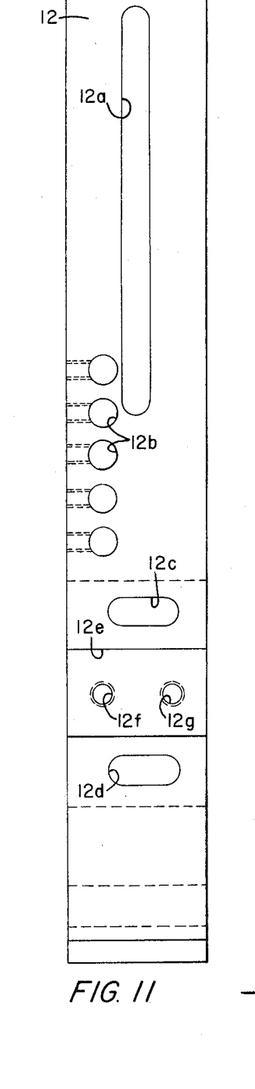
FIG. 11 is a rear elevational view of the post, per se, taken substantially along the line of 11—11 of FIG. 7.

The rear elevational view of the post 12 of FIG. 11 shows the various apertures and slots which permit adjustment of the constituent parts of the thread gage. Proceeding from top to bottom, the post 12 has a vertical slot 12a which receives bolts 114 and 116 to secure the mounting plate 34 to the post 12. The slot 12a allows for a limited vertical adjustment of the mounting plate, and hence the floating reed assembly 33. Spaced apertures 12b are adapted to furnish support for the stem 28c of the backstop 28 in a plurality of vertically spaced positions, the backstop also being positionable for adjustment toward and away from the gage tip. Slots 12c and 12d respectively contain bolts 24 and 26 and serve to accommodate horizontal adjustment of the anvil 22. The recess 12e, which communicates with threaded bores 12f and 12g, may receive an outrigger structure (not shown) to support a long threaded member outwardly of the anvil with a part of the threaded member supported on the anvil.

OPERATION

A. Adjustment

In order to adjust the illustrated thread gage, the toggle switch 10a is placed in the pitch diameter position and the depending cylindrical portion 30c of gage head 30 is axially moved within the cavity 88 of indicator bracket 70 until the pointer of the meter 14 reads slightly off the depicted scale. The gage head 30 is now locked in position in indicator bracket 70 by a turning of the lock screw thereof. The toggle switch 10a is now placed in the drunkenness position and the gage head 32 is positioned in the indicator bracket 44 such that the pointer of the meter 14 reads slightly off scale. In like manner, the gage head 32 is locked in the indicator bracket 44 by means of the lock screw 98. At this point in the adjustment procedure, the anvil 22 is laterally displaced, if necessary, to position the fixed roll 100 approximately one-half pitch to the right of the gage tip 20. A zero master is now placed on the floating roll 104 and slid thereover until the backstop 28 is contacted on its slanting face 28a. The backstop 28 may now be positioned, while maintaining contact with the zero master, such that the zero master is directly positioned under the gage tip. The backstop 28 is now locked in place.

Returning the toggle switch 10a to the pitch diameter position, and with the zero master in contact with the backstop directly under the gage tip 20, the mounting plate 34 is vertically positioned until the extremity 20a of the gage tip is tangentially received in the groove of the zero master and further vertically positioned until the pointer of the meter 14 reads near the zero mark. The pitch diameter knob 10b is now turned until the pointer is placed exactly at the zero reading.

Returning the toggle switch 10a to the drunkenness position and with the zero master engaged with the gage tip 20 and in contact with the backstop 28, the anvil 22 is laterally adjusted until the pointer of the meter 14 reads near the zero mark. The drunkenness knob 10c is now turned until the pointer of the meter 14 reads exactly zero. The zero master may now be removed as the gage is now ready to perform measurements. Obviously, the measurements of pitch diameter obtainable from such a gage are referenced to the pitch diameter of the zero master and thus must be added thereto to yield an absolute reading of pitch diameter.

B. Measurement

The threaded member to be gaged is placed on the anvil with the groove of the thread on the floating roll 104. The threaded member is then moved forwardly until the groove of the thread engages the fixed gage roll 100 and further forwardly into contact with the inclined surface 28a of backstop 28, the backstop serving to position the threaded member directly under the gage tip 20, and to stabilize the threaded member. Insertion of the threaded member under the backstop produces a vertical displacement of the gage tip 20 which will cause the floating reed mount 76 to be upwardly displaced along with a consequential vertical displacement of contact abutment 80, the reeds 66 and 68 flexing during this operation. Gage head 30 senses the upward displacement of the contact abutment 80 through probe 30d and generates an electrical signal which is converted to a reading on the meter 14 which is indicative of pitch diameter.

In order to check ovality, the threaded member is rotated while the meter 14 is observed to ascertain the variations in the pitch diameter readings. A constant reading, of course, would indicate a near perfect ovality in the threaded member.

Drunkenness in the threaded member is sensed as the member is rotated in a like manner. Any drunkenness in the thread will result in a lateral displacement of the gage tip which in turn will produce a horizontal movement of spindle 18, floating reed mount 76, indicator bracket 70, reed mounts 56 and 58 and contact abutment 64. Lateral displacement of the contact abutment 64 is sensed by the gage head 32 via its probe which has its tip in contact with the contact abutment 64. Fluctuations in the signals generated by gage head 32, as depicted upon the meter 14, represent the drunkenness of the threaded member.

From the foregoing, it should be apparent that the invention provides a simple and economical means of ascertaining drunkenness, pitch diameter and ovality in a threaded member.

Obviously many modifications and variations are possible in light of the above teachings without departing from the scope and spirit of the invention as defined in the appended claims.

What is claimed is:

1. In a thread gage for measuring the characteristics of a threaded member, the combination comprising:
a frame;

a support on the frame for receiving a threaded member with its axis fixedly orientated with respect to the frame;

a gage tip adapted to be placed in the groove of a thread upon the threaded member;

a floating structure connected to the gage tip for movement therewith in a first direction, defined by the axis of the threaded member, and in a second direction, transverse to the axis of the threaded member, as the threaded member is rotated with the gage tip in the groove;

a first reed, having a flexible central portion, fixedly connected to the frame at two locations thereupon such that the flexible central portion is disposed between the two locations and may flex in the first direction;

a second reed, having a flexible central portion, fixedly connected to the frame at two locations thereupon in parallel spaced relationship to the first reed such that the flexible central portion of the second reed is disposed between the second mentioned two locations and may flex in the first direction, the floating structure being disposed between the first and second reeds;

a third reed, having a flexible central portion, transverse to the first and second reeds and disposed therebetween, the third reed being connected to the floating structure at the flexible central portion thereof;

a fourth reed, having a flexible central portion, disposed between the first and second reeds in parallel spaced relationship to the third reed, the fourth reed being connected to the floating structure at the flexible central portion thereof; and means interconnecting the flexible central portions of the first and second reeds and the third and fourth reeds to transmit displacements of the structure in the first direction to the flexible central portions of the first and second reeds for producing a corresponding flexing thereof and to allow displacements of the structure in the second direction to produce a corresponding flexing of the flexible central portions of the third and fourth reeds.

2. The combination, as defined in claim 1, wherein the support comprises:

an anvil secured to the frame;

a fixed roll on the anvil to be received in the groove of the thread;

a floating roll on the anvil in parallel spaced relationship to the fixed roll, the floating roll being adapted to be received in the groove of the thread and displaceable toward and away from the fixed roll; and a backstop secured to the frame adjacent the anvil, the backstop being adapted to contact the periphery of the threaded member 3. The combination, as defined in claim 2, further including:

first means to adjust the position of the anvil; and
second means to adjust the position of the backstop such that threaded members of varying diameters may be accommodated.

4. The combination, as defined in claim 3, wherein the first means comprises:

an elongated slot in the frame, extending in the first direction; and wherein the second means comprises:

a row of apertures in the frame, the row extending in the second direction.

5. The combination, as defined in claim 1, wherein the interconnecting means comprises:

first and second reed mounts respectively secured to the inboard surfaces of the flexible central portions of the first and second reeds and respectively secured to the third and fourth reeds at locations spaced from the flexible central portions thereof such that the floating structure is disposed between the first and second reed mounts.

6. The combination, as defined in claim 1, further including:

a first indicator bracket fixedly secured to the frame adjacent the first reed for carrying a gage head to measure the flexing of the flexible central portion of the first reed; and a second indicator bracket mounted upon the interconnecting means to move with the floating structure and the third and fourth reeds in the first direction for carrying a gage head to measure the flexing of the flexible central portion of the third reed.

7. The combination, as defined in claim 5, wherein the reed mounts have respective cavities and the floating structure is partially received within the cavities for movement therein, and wherein there is further provided:

means in the cavities to urge the floating structure toward the threaded member to insure that the gage tip is firmly seated in the groove.

8. In a thread gage, the combination of:

a frame;

a support on the frame to receive a threaded member with the axis thereof fixedly orientated with respect to the frame;

a gage tip having a ridge thereupon, the ridge being adapted to be received within the groove of the thread on the threaded member;

a floating structure connected to the gage tip to follow the movements thereof in the direction of the member's axis and in the direction transverse to the member's axis;

first and second spaced reeds, having flexible central portions, secured to the frame such that the reeds are transverse to the axis of the threaded member, the floating structure being disposed between the first and second reeds;

reed mounting means connected to the inboard surfaces of the flexible central portions of the first and second reeds;

third and fourth spaced reeds, having flexible central portions, disposed between the first and second reeds parallel to the axis of the threaded member, the inboard surfaces of the flexible central portions of the third and fourth reeds connected to the floating structure and the inboard surfaces of the third and fourth reeds connected to the mounting means at locations spaced from the flexible central portions thereof such that a movement of the floating structure in the direction of the threaded member's axis produces a corresponding movement of the mounting means and the third and fourth reeds together with a consequential flexing of the first and second reeds and such that a movement of the floating structure in the direction transverse to the threaded member's axis produces a corresponding flexing of the third and fourth reeds.

9. The combination, as defined in claim 8, wherein the frame comprises:
 a post;
 a mounting plate carried by the post;
 a pair of spaced mounting brackets attached to the plate, the inboard surfaces of each of the first and second reeds in contact with both of the mounting brackets.

10. The combination, as defined in claim 9, further including:
 a first indicator bracket fixedly secured to both mounting brackets adjacent the first reed for securing the first reed to the mounting brackets and for carrying a first indicator;
 a second indicator bracket fixedly secured to the reed mounting means for securing the third reed thereto and for carrying a second indicator.

11. The combination, as defined in claim 8, wherein the reed mounting means includes two reed mounts comprising respective cavities, and wherein the floating structure is shaped as a cross and has two cavities respectively located in the outboard portions thereof, the outboard portions of the floating structure being received within the respective cavities of the reed mounts, and wherein there is further provided:
 a pair of compression springs located in the cavities of the floating structure and in contact with the reed mounts for biasing the ridge of the gage tip into the groove of the thread.

12. The combination, as defined in claim 8, wherein the support comprises:
 an anvil;
 a fixed roll secured to the anvil for reception in the groove of the thread;
 a floating roll secured to the anvil in spaced parallel relationship to the fixed roll, the floating roll being adapted to be received in the groove of the thread and displaceable toward and away from the fixed roll.

13. The combination, as defined in claim 12, wherein the support further comprises:
 a backstop, having a recess, secured to the frame adjacent the anvil, the backstop being adapted to engage the periphery of the threaded member.

14. A thread gage for measuring the pitch diameter, ovality and drunkenness of a threaded member comprising:
 a post;
 a pair of spaced mounting brackets;
 means securing the mounting brackets to the post;
 first and second spaced parallel reeds, each reed having a flexible central portion, and each reed being secured to both of the mounting brackets such that the flexible central portion is disposed therebetween;
 a pair of spaced reed mounts respectively secured to the inboard surfaces of the central portions of the first and second reeds, the reed mounts having cavities therein;
 third and fourth spaced parallel reeds having flexible central portions, each of the third and fourth reeds being secured to both of the reed mounts such that the respective flexible central portions thereof are disposed therebetween and such that the third and fourth reeds are disposed between the first and second reeds and extend transversely thereof;
 a cross-shaped floating reed mount, having two cavities in the outboard portions thereof, connected to the inboard surfaces of the central portions of the third and fourth reeds such that the outboard portions of the floating reed mount are received for movement in the respective cavities of the reed mounts;
 a pair of springs respectively located in the cavities of the floating reed mount in contact with the reed mounts for biasing the floating reed mount toward the fourth reed;
 an anvil secured to the post;
 a fixed roll secured to the anvil;
 a floating roll secured to the anvil in spaced parallel relationship to the fixed roll and displaceable toward and away from the fixed roll, the fixed and floating rolls being adapted to be received in the groove of the thread upon the threaded member;
 a backstop secured to the post adjacent the anvil for engaging the periphery of the threaded member;
 a gage tip, having a ridge thereupon, depending perpendicularly from the fourth reed and connected to the floating reed mount in such a manner that displacements of the gage tip are transmitted thereto, whereby axial displacements of the gage tip produce a corresponding flexing of the third and fourth reeds, and lateral displacements of the gage tip produce a corresponding flexing of the first and second reeds;
 means to measure the flexing of the first and second reeds for indicating drunkenness and;
 means to measure the flexing of the third and fourth reeds for indicating pitch diameter.

15. The combination, as defined in claim 14, wherein each reed comprises:
 a flat metallic plate having two parallel slots to define the flexible central portion.

16. In a thread gage, the combination comprising:
 a frame;
 a structure mounted upon the frame for simultaneous movement in two perpendicular directions;
 a support secured to the frame for receiving a threaded member in fixed orientation to the frame;

a fixed roll on the support for reception in the groove of the thread upon the threaded member;
 a floating roll on the support in spaced parallel relationship to the fixed roll, the floating roll being adapted to be received in the groove of the thread and displaceable toward and away from the fixed roll; and
 a gage tip connected to the structure, the gage tip having a ridge thereupon for insertion into the groove of the thread.

17. The combination, as defined in claim 16, wherein the fixed and floating rolls each comprise measuring wires.

18. In a thread gage for measuring the pitch diameter, ovality and drunkenness of a threaded member, the combination comprising:
 a frame including a pair of spaced mounting brackets;
 first and second spaced parallel reeds, each reed having a flexible central portion, and each reed being secured to both of the mounting brackets such that the central portion thereof is disposed therebetween;

a pair of spaced reed mounts respectively secured to the inboard surfaces of the central portions of the first and second reeds;

third and fourth spaced parallel reeds having flexible central portions, each of the third and fourth reeds being secured to both of the reed mounts such that the respective flexible central portions thereof are disposed therebetween and such that the third and fourth reeds are disposed between the first and second reeds and extend transversely thereof;

a floating structure connected to the inboard surfaces of the central portions of the third and fourth reeds such that it is disposed between the reed mounts;

a gage tip, having a ridge thereupon, depending perpendicularly from the central portion of the fourth reed and connected to the floating structure in such a manner that displacements of the gage tip are transmitted thereto, whereby axial displacements of the gage tip produce a corresponding flexing of the third and fourth reeds, and lateral displacements of the gage tip produce a corresponding flexing of the first and second reeds together with a corresponding movement of the floating structure, the third and fourth reeds and the reed mounts;

an anvil secured to the frame;

a fixed roll secured to the anvil;

a floating roll secured to the anvil in spaced parallel relationship to the fixed roll and displaceable toward and away from the fixed roll, the fixed and floating rolls adapted to be received in the groove of the thread upon the threaded member and the ridge of the gage tip being adapted to be received in the groove of the thread upon the threaded member on the opposite side thereof for duplicating the three wire method of measuring pitch diameter.

19. A thread gage, as defined in claim 18, further including:

a first contact element secured to the outboard surface of the central portion of the first reed;

a second contact element secured to the outboard surface of the central portion of the third reed;

a first gage head, having a probe, carried by the frame such that the tip of the probe engages the first contact element;

a second gage head, having a probe, carried by the reed mounts for movement therewith such that the tip of the second mentioned probe engages the second contact element and remains in fixed relationship thereto during lateral displacements of the gage tip, thereby to avoid sliding contact therebetween.

20. A thread gage, as defined in claim 19, further including:

a first indicator bracket fixedly secured to both mounting brackets for securing the first reed to the mounting brackets and for carrying the first gage head:

a second indicator bracket fixedly secured to the reed mounts for securing the third reed thereto and for carrying the second gage head.

* * * * *